US012654099B2

(12) United States Patent
Zhang et al.

(10) Patent No.: US 12,654,099 B2
(45) Date of Patent: Jun. 16, 2026

(54) USER INTERFACE DISPLAY METHOD, APPARATUS, DEVICE, AND MEDIUM

(71) Applicant: TENCENT TECHNOLOGY (SHENZHEN) COMPANY LIMITED, Shenzhen (CN)

(72) Inventors: Weisong Zhang, Shenzhen (CN); Chenxing Pei, Shenzhen (CN); Peiyuan Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 358 days.

(21) Appl. No.: 18/344,298

(22) Filed: Jun. 29, 2023

(65) Prior Publication Data

US 2023/0347242 A1 Nov. 2, 2023

Related U.S. Application Data

(63) Continuation of application No. PCT/CN2022/127101, filed on Oct. 24, 2022.

(30) Foreign Application Priority Data

Dec. 10, 2021 (CN) .......................... 202111504223.8

(51) Int. Cl.
*A63F 13/79* (2014.01)
*A63F 13/533* (2014.01)
(Continued)

(52) U.S. Cl.
CPC .......... *A63F 13/533* (2014.09); *A63F 13/537* (2014.09); *A63F 13/55* (2014.09)

(58) Field of Classification Search
None
See application file for complete search history.

(56) References Cited

U.S. PATENT DOCUMENTS 9,485,328 B2 * 11/2016 Abe ........................ A63F 13/58
9,517,417 B2 * 12/2016 Austerlade ......... G06Q 10/0639
(Continued)

FOREIGN PATENT DOCUMENTS

CN 108392828 A 8/2018
CN 108939542 A 12/2018
(Continued)

OTHER PUBLICATIONS

China National Intellectual Property Administration (CNIPA) Office Action 1 for Application No. 202111504223.8 Jan. 24, 2025 28 Pages (including translation).
(Continued)

*Primary Examiner* — Sunit Pandya
(74) *Attorney, Agent, or Firm* — Anova Law Group, PLLC

(57) ABSTRACT

A user interface display method includes: displaying an arena entrance of a qualifying mode, the qualifying mode being one of at least two match modes provided by a client, and the qualifying mode being an arena mode for determining a gaming competence rank of a user account in a ranking list; in response to a trigger operation on the arena entrance, controlling a virtual character of the user account to participate in a qualifying match of the qualifying mode; in response to successfully participating in the qualifying match, displaying a journey value obtained in a current season during participating in the qualifying match, the journey value being a numeral value related to times of participating in qualifying matches in the current season by the user account; and in response to that the journey value reaches a level threshold, displaying an obtained journey reward corresponding to the level threshold.

16 Claims, 9 Drawing Sheets

Display an arena entrance of a qualifying mode — 402

In response to a trigger operation on the arena entrance, control a virtual character of a user account to participate in a qualifying match. — 404

In response to successfully participating in the qualifying match, display a sum of journey values obtained in the current season during participating in at least one qualifying match; and/or, display a single journey value obtained in the current season during participating in a single qualifying match — 406

In response to that the journey value reaches a level threshold, display an obtained season reward corresponding to the level threshold. — 408

(51) Int. Cl.
    *A63F 13/537*     (2014.01)
    *A63F 13/55*     (2014.01)

(56)           References Cited

U.S. PATENT DOCUMENTS

| | | | | |
|---|---|---|---|---|
| 11,117,059 | B2* | 9/2021 | Morita | A63F 13/77 |
| 11,524,234 | B2* | 12/2022 | Salik | A63F 13/63 |
| 2006/0063581 | A1 | 3/2006 | Harris et al. | |
| 2008/0274805 | A1* | 11/2008 | Ganz | G06N 3/006 |
| | | | | 463/29 |
| 2015/0148131 | A1* | 5/2015 | Owaku | A63F 13/33 |
| | | | | 463/31 |
| 2016/0067611 | A1* | 3/2016 | Ware | A63F 13/79 |
| | | | | 463/29 |
| 2016/0067615 | A1* | 3/2016 | Lai | A63F 13/327 |
| | | | | 463/23 |

FOREIGN PATENT DOCUMENTS

| | | |
|---|---|---|
| CN | 110111149 A | 8/2019 |
| CN | 111679879 A | 9/2020 |
| CN | 112402971 A | 2/2021 |
| CN | 112546635 A | 3/2021 |
| CN | 113171617 A | 7/2021 |
| CN | 114130012 A | 3/2022 |
| CN | 114130018 A | 3/2022 |
| JP | 6220428 B1 | 10/2017 |
| WO | 2008018513 A1 | 2/2008 |

OTHER PUBLICATIONS

Prince Vegeta-Mobile Game Sharing, League of Legends Mobile [Full Version—Ranked Match], https://www.bilibili.com/video/BV1z34y1U7WP/?spm_id_from=333.1387.favlist.contentclick&vd_source=5ceb31e064d5a449f8a35cf967ecca05, Oct. 9, 2021 (Oct. 9, 2021), Video 0.00-4.07.

Mobile Game Meow, LOL Mobile Version 2.6 New Equipment Ranked Match Rewards! Get the Canyon Treasure Book at Level 50!, http://www.bilibili.com/video/BV1iP4y1V7Yd/?spm_id_from=333.1387.favlist.content.click&vd_source=5ceb31e064d5a449f8a35cf967ecca05, Nov. 30, 2021 (Nov. 30, 2021), Video 1.29-3.33.

The World Intellectual Property Organization (WIPO) International Search Report for PCT/CN2022/127101 Jan. 11, 2023 12 Pages (including translation).

\* cited by examiner

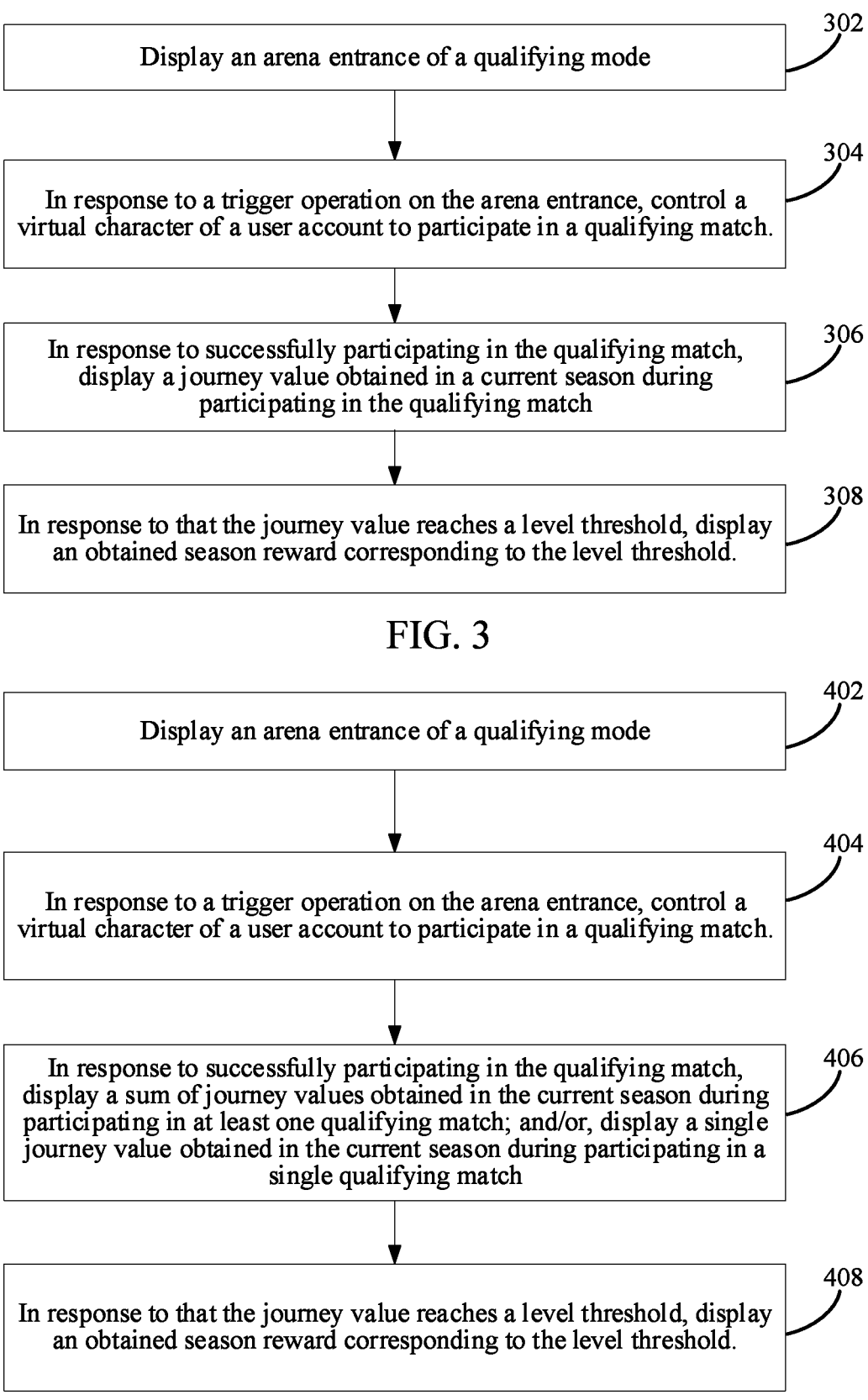

Display an arena entrance of a qualifying mode                                      302

In response to a trigger operation on the arena entrance, control a
virtual character of a user account to participate in a qualifying match.          304

In response to successfully participating in the qualifying match,
display a journey value obtained in a current season during
participating in the qualifying match                                              306

In response to that the journey value reaches a level threshold, display
an obtained season reward corresponding to the level threshold.                    308

FIG. 3

Display an arena entrance of a qualifying mode                                      402

In response to a trigger operation on the arena entrance, control a
virtual character of a user account to participate in a qualifying match.          404

In response to successfully participating in the qualifying match,
display a sum of journey values obtained in the current season during
participating in at least one qualifying match; and/or, display a single
journey value obtained in the current season during participating in a
single qualifying match                                                            406

In response to that the journey value reaches a level threshold, display
an obtained season reward corresponding to the level threshold.                    408

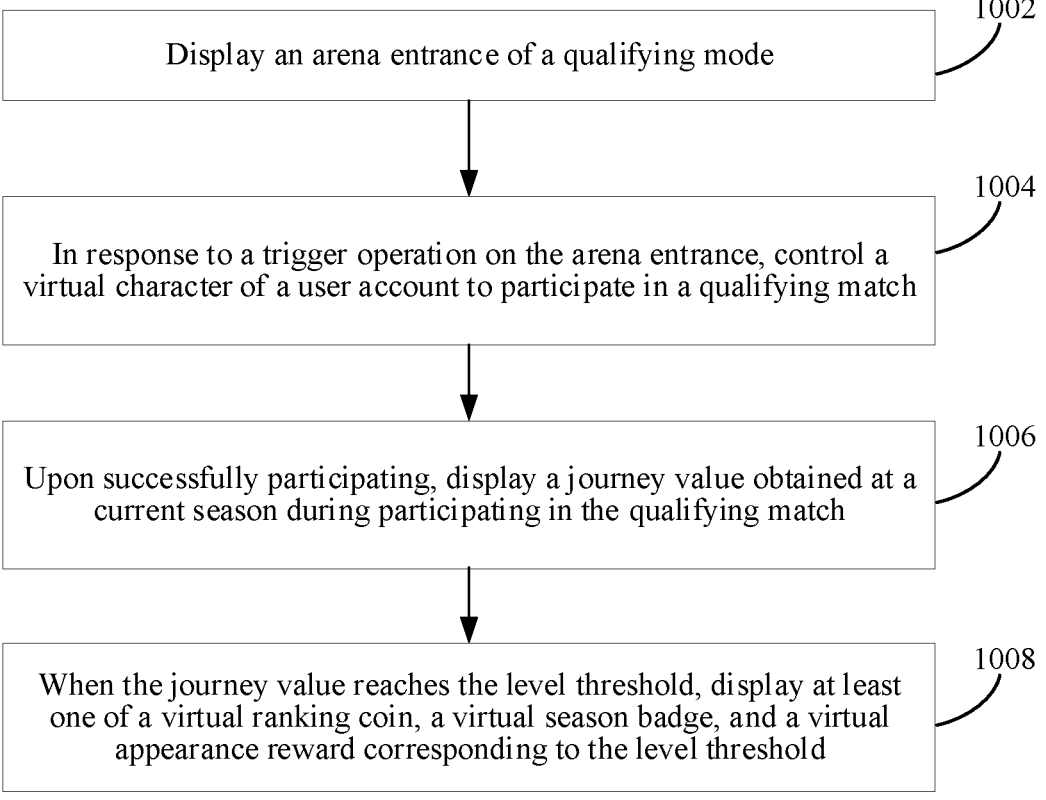

Display an arena entrance of a qualifying mode                                                1002

In response to a trigger operation on the arena entrance, control a virtual character of a user account to participate in a qualifying match                                                1004

Upon successfully participating, display a journey value obtained at a current season during participating in the qualifying match                                                1006

When the journey value reaches the level threshold, display at least one of a virtual ranking coin, a virtual season badge, and a virtual appearance reward corresponding to the level threshold                                                1008

FIG. 10

USER INTERFACE DISPLAY METHOD, APPARATUS, DEVICE, AND MEDIUM

CROSS-REFERENCES TO RELATED APPLICATIONS

This application is a continuation application of PCT Patent Application No. PCT/CN2022/127101, filed on Oct. 24, 2022, which claims priority to Chinese Patent Application No. 202111504223.8, entitled "USER INTERFACE DISPLAY METHOD, APPARATUS, DEVICE, MEDIUM, AND PROGRAM PRODUCT" filed on Dec. 10, 2021, the entire contents of both of which are incorporated herein by reference.

FIELD OF THE TECHNOLOGY

Embodiments of the present disclosure relate to the field of man-machine interaction, and in particular, to a user interface display method, apparatus, device, medium, and program product.

BACKGROUND

A battle game is a game where a plurality of user accounts compete in a same scene. In some embodiments, the battle game may be a Multiplayer Online Battle Arena Games (MOBA).

In a typical MOBA game, many auxiliary system, such as a virtual mall, a virtual backpack, personal information, a virtual collection, and a season journey, may often be designed. Meanwhile, to increase players' participation degree in the game, a variety of game modes are often set in the game, such as a matching mode, a ranking mode, a peak mode, and an entertainment mode.

However, in the ranking mode of the MOBA game, there is only a mechanism to reward and punish players simply by winning and losing. As a result, the players participating in the ranking mode face a great competitive pressure, rendering a decrease in the number of players participating in the ranking mode, so that server resources corresponding to the ranking mode cannot be effectively utilized.

SUMMARY

The present disclosure provides a user interface display method, apparatus, device, medium, and program product, facilitating effective usage of the server resources corresponding to the ranking mode. The technical solutions are as follows.

According to one aspect of the present disclosure, a user interface display method is provided. The method includes: displaying an arena entrance of a qualifying mode, the qualifying mode being one of at least two match modes provided by a client, and the qualifying mode being an arena mode for determining a gaming competence rank of a user account in a ranking list; in response to a trigger operation on the arena entrance, controlling a virtual character of the user account to participate in a qualifying match of the qualifying mode; in response to successfully participating in the qualifying match, displaying a journey value obtained in a current season during participating in the qualifying match, the journey value being a numeral value related to times of participating in qualifying matches in the current season by the user account; and in response to that the journey value reaches a level threshold, displaying an obtained journey reward corresponding to the level threshold.

According to another aspect of the present disclosure, a user interface display apparatus is provided, including: a display module, configured to display an arena entrance of a qualifying mode, the qualifying mode being one of at least two match modes provided by the client, and the qualifying mode being an arena mode for determining a gaming competence rank of a user account in a ranking list; a man-machine interaction module, configured to, in response to a trigger operation on the arena entrance, control a virtual character of the user account to participate in a qualifying match of the qualifying mode; the display module, configured to, in response to successfully participating in the qualifying match, display a journey value obtained in a current season during participating in the qualifying match, the journey value being a numeral value related to times of participating in qualifying matches in the current season by the user account; and the display module, configured to, in response to that the journey value reaches a level threshold, display an obtained journey reward corresponding to the level threshold.

According to another aspect of the present disclosure, a computer device is provided, and the computer device includes: at least one processor and at least one memory, the at least one memory storing at least one computer instruction, and the at least one computer instruction being loaded and executed by the at least one processor to implement the user interface display method according to the aspects above.

According to another aspect of the present disclosure, a non-transitory computer storage medium is provided; the computer-readable storage medium stores at least one computer instruction, the at least one computer instruction being loaded and executed by a processor to implement the user interface display method according to the aspects above.

The technical solutions provided in the present disclosure have at least the following beneficial effects: displaying an arena entrance of a qualifying mode; by triggering the arena entrance, controlling a virtual character of a user account to participate in a qualifying match; in response to successfully participating in the qualifying match, displaying a journey value obtained in a current season during participating in the qualifying match; and in response to that the journey valve reaches a level threshold, displaying an obtained journey reward corresponding to the level threshold. In the present disclosure, controlling the virtual character of the user account to participate in the qualifying match in the current season can obtain an additional journey reward in the current season, to form an additional reward system exclusive to the qualifying match. By providing the additional exclusive reward, the participation rate of a user is improved, so as to increase the resource utilization rate of the server.

BRIEF DESCRIPTION OF THE DRAWINGS

FIG. 3 is a flowchart of a user interface display method according to an exemplary embodiment of the present disclosure.

FIG. 4 is a flowchart of a user interface display method according to an exemplary embodiment of the present disclosure.

FIG. 10 is a flowchart of a user interface display method according to an exemplary embodiment of the present disclosure.

DESCRIPTION OF EMBODIMENTS

An embodiment of the present disclosure provides a technical solution of a user interface display method.

Exemplarily, the game includes multiple game modes, such as a matching contest, a qualifying, a peak contest, and an entertainment contest.

An arena entrance of the qualifying mode is displayed on the user interface; the user triggers the arena entrance of the qualifying mode to display a game interface corresponding to the qualifying. The client controls the virtual character of the user account to participate in the qualifying match.

In response to that the user account successfully participates in the qualifying match of the qualifying mode, display a journey value obtained by the user account in a current season during participating in the qualifying match, the journey value being a numeral value related to times of participating in qualifying matches in the current season by the user account; and in response to that the journey value reaches a level threshold, display an obtained journey reward corresponding to a level threshold.

In some embodiments, the journey reward includes: at least one of the virtual ranking coin, virtual season badge, and virtual appearance reward, but is not limited to this, which is not limited by the present disclosure embodiment herein.

Figure 1:
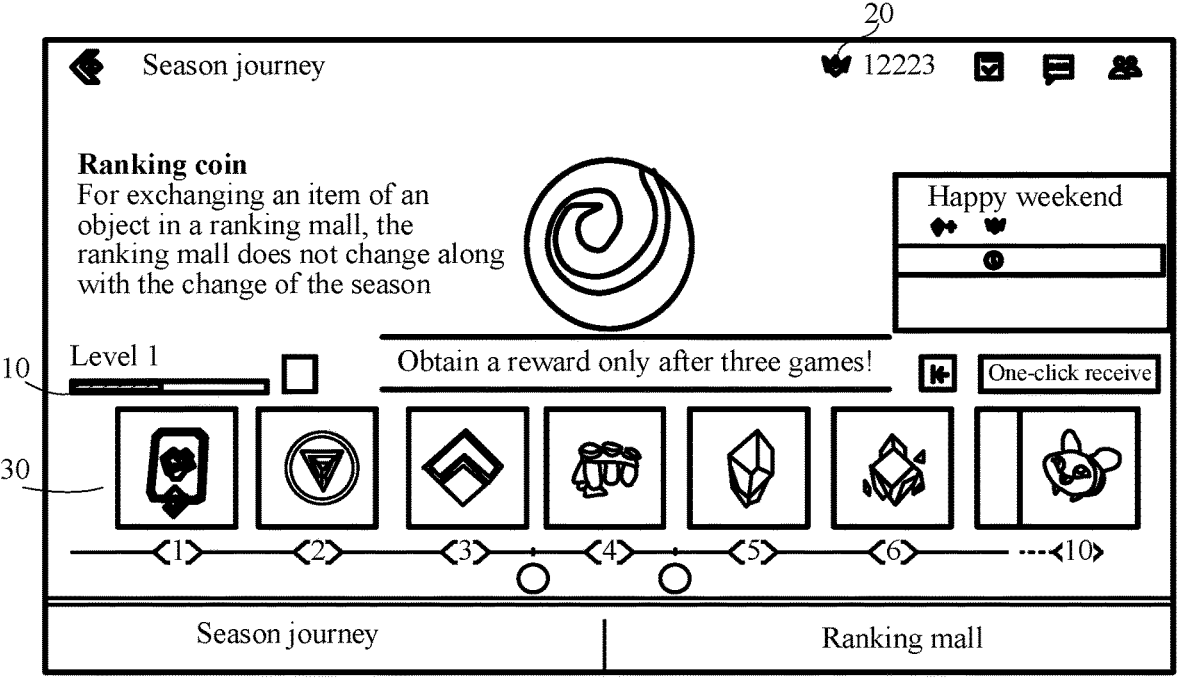
FIG. 1 is a schematic diagram of a season journey page according to an exemplary embodiment of the present disclosure.

As shown in FIG. 1, the season journey page displays the total amount of the ranking coins 20 obtained by the user account during the current season. For example, this page displays that the total amount of the ranking coins 20 obtained by the user account is 12223. The journey value 10 obtained by the user account in the current season is displayed in the season journey page. For example, the total number of the journey value 10 obtained by user account in the current season in this page is 88888. Levels 1-10 in the season journey page respectively represent a season journey level. When the journey value reaches a level threshold corresponding to a level, the user account obtains a journey reward 30 corresponding to the level threshold. For example, a check mark displayed on the journey reward corresponding to level 1 is used for indicating that the user account has successfully received the journey reward 30 corresponding to level 1.

Exemplarily, in response to that the user account successfully participates in the qualifying match of the qualifying mode, display the sum of the journey values 10 obtained in the current season during participating in at least one qualifying match of the qualifying mode on the settlement interface. Or, in response to that the user account successfully participates in the qualifying match of the qualifying mode, display the entrance of the season activity page in the current season; the entrance of the season activity page displays the sum of the journey values 10 obtained in the current season during participating in at least one qualifying match of the qualifying mode.

Exemplarily, in response to that the user account successfully participates in the first n qualifying matches of the qualifying mode in the first duration of the current season, display an addition journey value obtained in the first duration during participating in the qualifying match of the qualifying mode, n being a positive integer.

For example, during the weekend, the obtained journey value in the first three qualifying matches participated in by the user account in the current season has an addition effect. That is, the first three qualifying matches participated in by the user account in the current season can obtain more journey values.

Exemplarily, based on that the user account successfully participates in the qualifying match of the qualifying mode in the second duration, determine the hidden credits; and in response to that the user account participates in the qualifying match of the qualifying mode in the second duration and wins in the qualifying match, determine a third quantity of the hidden credits; and in response to that the user account participates in the qualifying match of the qualifying mode in the second duration and loses in the qualifying match, determine a fourth quantity of the hidden credits, the third quantity being less than the fourth quantity; based on the hidden credit, determine a session number n of the qualifying match that obtains the addition journey value in the first duration.

For example, in response to that the user account participates in the qualifying match of the qualifying mode in the second duration, and wins in the qualifying match, the user account obtains 5 credits; in response to that the user account participates in the qualifying match of the qualifying mode in the second duration and loses in the qualifying match, the user account obtains 15 credits; every time when the credits exceed 30 points, one qualifying match with the addition journey value can be obtained in the first duration.

Exemplarily, display the exclusive ranking mall entrance of the qualifying mode; by trigging the entrance of the ranking mall, display a mall interface of the ranking mall exclusive to the qualifying mode, and the mall interface includes at least one virtual item purchasable using the virtual ranking coin.

In some embodiments, the virtual appearance reward includes at least one of a virtual profile photo, a virtual expression, virtual skin, a return-to-city special effect, a home-guard special effect and a virtual team flag, but is not limited to this, which is not limited by the present disclosure embodiment herein.

Exemplarily, display the entrance of the personal information of the user account; by triggering the entrance of the personal information, display an account information page of the user account, and display, in the account information page, the virtual season badge obtained by the user account in the current season.

Exemplarily, display an entrance of a virtual collection exclusive to the qualifying mode; by triggering the entrance of the virtual collection, display the virtual appearance reward obtained by the user account in the current season; and/or, display an exclusive virtual item purchased by the user account using the virtual ranking coin; the exclusive virtual item is a virtual item exclusive to the qualifying mode in the current season.

Exemplarily, display an entrance of a season activity page of the current season; and by triggering the entrance of the season activity page of the current season, display the season activity page, display, on the season activity page, the journey reward obtained by the user account in the current season, and/or obtain the journey reward upon meeting a next level threshold.

Exemplarily, in response to that the user account has not yet participated in the qualifying match in the first duration, display prompt information; the prompt information is used for prompting the user account to participate in the qualifying match in the first duration. That is, the prompt information is used for prompting the user account to participate in the qualifying match in the first duration, so that an account activation in the first duration ensures the resource usage rate of the server.

For example, if the user account does not participate in a qualifying match during the first duration of the current season, the server sends prompt information to the terminal for indicating that the first duration of the user account in the current season is started. For example, during the duration from 8:00 PM on Friday to 0:00 PM on Monday, the virtual character of the user account may obtain 1.5 times of the journey value for the first 5 qualifying matches played. If the user account does not participate in the qualifying match after 8:00 PM on Friday, the terminal will receive prompt information.

As can be understood that the prompt information would only be received when the client starts a terminal notification permission for the game.

In the present disclosure, the exclusive relationship between the qualifying mode and the season is used; by participating in the qualifying match of the qualifying mode in the current season, the additional journey reward is obtained in the current season, and the additional journey reward obtained in the current season is displayed on the virtual collection page, the season activity page, and the account information page, so that the user account links the qualifying mode to the virtual mall, personal information, virtual collection, and season activity during the process of participating in the qualifying match of the qualifying mode. In the embodiment of the present disclosure, controlling the virtual character of the user account to participate in the qualifying match in the current season can obtain an additional journey reward in the current season. By providing the additional exclusive reward, the participation rate of a user is improved, so as to increase the resource utilization rate of the server.

Figure 2:
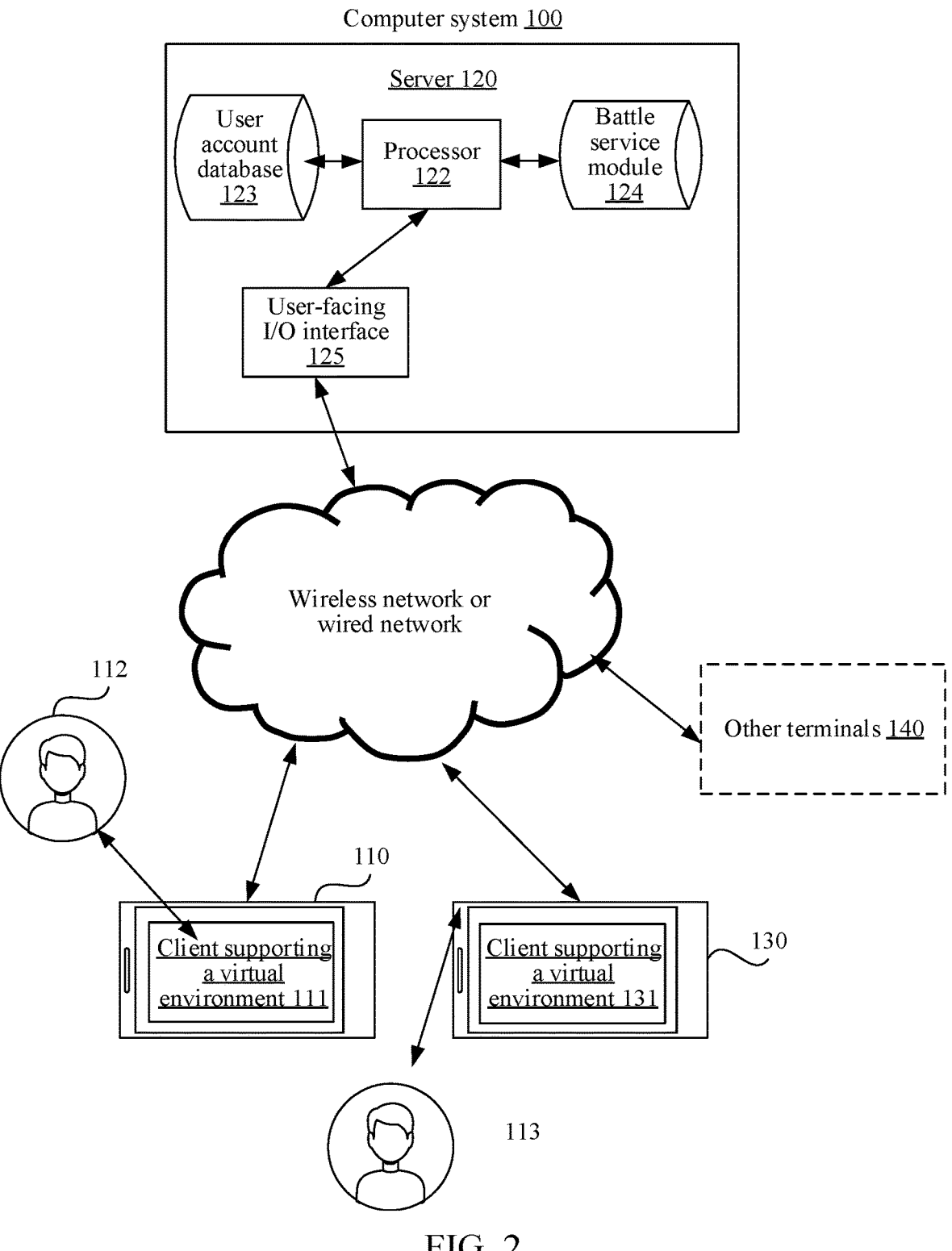
FIG. 2 is a structural block diagram of a computer system according to an exemplary embodiment of the present disclosure.

FIG. 2 is a structural block diagram of a computer system according to an exemplary embodiment of the present disclosure. The computer system 100 includes: a first terminal 110, a server 120, and a second terminal 130.

The first terminal 110 is mounted with and runs a client 111 that supports the virtual environment; the client 111 may be a multi-player online battle program. when the first terminal runs the client 111, a screen of the first terminal 110 displays the user interface of the client 111. The client 111 may be any one of a big escape kill shooting game, a Virtual Reality (VR) application program, an Augmented Reality (AR) program, a three-dimensional map program, a virtual reality game, an Augmented Reality (AR) game, a First-Person Shooting Game (FPS), a Third-Personal Shooting Game (TPS), a Multiplayer Online Battle Arena Games (MOBA), and a Simulation Game (SLG). In this embodiment, the client 111 being the MOBA game is taken as an example for explanation. The first terminal 110 is a terminal used by the first user 112. The first user 112 uses the first terminal 110 to control activities of the first virtual character in the virtual environment. The first virtual character can be called the virtual character of the first user 112. The first user 112 can control the first virtual character to participate in at least one of multiple match modes, which is not limited herein by the present disclosure. Exemplarily, the first virtual character is a first virtual character, such as an emulation figure character or an animation figure character.

The second terminal 130 is mounted with and runs a client 131 that supports the virtual environment; the client 131 may be a multi-player online battle program. When the second terminal 130 runs the client 131, a screen of the second terminal 130 displays the user interface of the client 131. The second terminal 130 is a terminal used by the second user 113. The second user 113 uses the second terminal 130 to control activities of the second virtual character in the virtual environment and control the second virtual character to participate in at least one of the multiple match modes. The second virtual character can be called the virtual character of the second user 113.

In some embodiments, the first virtual character and the second virtual character are located in the same virtual environment. In some embodiments, the first virtual character and the second virtual character may belong to a same alignment, a same team, or a same organization, have a friend relationship or have a temporal communication authority. In some embodiments, the first virtual character and the second virtual character may belong to different alignments, different teams, or different organizations, or have an adversarial relationship.

In some embodiments, the clients mounted on the first terminal 110 and the second terminal 130 are the same or the clients mounted on two clients are the same type of clients on different operating system platforms (Android or IOS). The first terminal 110 can refer to one of multiple terminals in general, and the second terminal 130 can refer to another one of the multiple terminals in general. This embodiment only takes the first terminal 110 and the second terminal 130 as examples for explanation. The device types of the first terminal 110 and the second terminal 130 may be the same or different. The device types include: at least one of a smart phone, a tablet computer, an E-book reader, an MP3 player, an MP4 player, a laptop computer, or a desk computer.

FIG. 2 merely shows two terminals. However, multiple other terminals 140 exist in different embodiments, and can access the server 120. In some embodiments, one or more terminals 140 also existing are terminals corresponding to a developer. A client development and editing platform that supports the virtual environment is installed on the terminal 140. The developer can edit and update the client on the terminal 140, and transfer the updated client installation package to the server 120 through a wired or wireless network. The first terminal 110 and the second terminal 130 can download the client installation package from the server 120 to update the client.

The first client 110, the second terminal 130, and other terminals 140 are connected to the server 120 through the wired network or wireless network.

The server 120 includes at least one of a server, a plurality of servers, a cloud computing platform, and a virtualization center. The server 120 is used for providing a background service to a client that supports the three-dimensional virtual environment. In some embodiments, the server 120 undertakes main computing work, and the terminal undertakes secondary computing work; or the server 120 undertakes the secondary computing work, and the terminal undertakes the main computing work; or the server 120 and the terminal use a distributed computing architecture for cooperative computing.

In an exemplary example, the server 120 includes a processor 122, a user account database 123, a battle service module 124, and a user-facing Input/Output Interface (I/O interface) 125. The processor 122 is used for loading the instructions stored in the server 121 and processing the data in the user account database 123 and the battle service module 124. The user account database 123 is used for storing the data of the user account used by the first terminal 110, the second terminal 130, and other terminals 140, such as the user account profile photo, the user account nickname, the user account battle power index, and the service region where the user account resides. The battle service module 124 is used for providing multiple battle rooms for the users to battle, such as 1V1 battle, 3V3 battle, and 5V5 battle. The User-facing I/O interface 125 is used for establishing communication with the first terminal 110 and/or second terminal 130 over the wireless or wired network to exchange data.

FIG. 3 is a flowchart of user interface display according to an exemplary embodiment of the present disclosure. The method can be executed by the terminal in the system or the client on the terminal as shown in FIG. 2. The method includes the following steps:

Step 302: Display an arena entrance of a qualifying mode.

The qualifying mode is one of at least two match modes provided by the client, and the qualifying mode is an arena mode for determining a gaming competence rank of a user account in a ranking list. That is, the gaming competence rank of the user account is determined according to the performance and/or an arena result of the user account in the arena process.

In some embodiments, the gaming competence rank is a virtual level title that shows the strength of the user account in the arena process. The gaming competence rank includes at least one of a bronze grade, a silver grade, a gold grade, a platinum grade, a diamond grade, a strongest king grade, and an Honor king grade, which is not limited in the embodiment of the present disclosure.

In some embodiments, the match mode provided by the client includes at least two of the matching race, the qualifying, and the peak race, but is not limited to this, which is not limited by the present disclosure embodiment herein.

The matching race refers to an arena mode for matching user accounts randomly for the match.

The peak race refers to an arena mode for matching user accounts reaching the first level for the match. For example, the first level can be set as the king level, that is, the user accounts participating in the peak race are all at the king level.

In some embodiments, the arena entrance is the entrance control entering the arena match. The user accounts can participate in the arena match by triggering the arena entrance.

In some embodiments, the arena entrance can be displayed at a game start interface or being displayed at the mode selection interface, but is not limited to this, which is not limited by the present disclosure embodiment herein.

Step 304: In response to a trigger operation on the arena entrance, control a virtual character of a user account to participate in a qualifying match.

Exemplarily, the user account may own multiple virtual characters; after triggering the arena entrance of the qualifying mode, the client may control one virtual character of the user account to participate in the qualifying match of the qualifying mode.

Step 306: In response to successfully participating in the qualifying match, display a journey value obtained in a current season during participating in the qualifying match.

The journey value refers to an exclusive name of experiences or credits obtained by the user account in the current season by participating in the qualifying match. The obtaining of the journey value is related to the times of the user account to participate in the qualifying match in the current season. For example, the user account can obtain a certain quantity of journey values for each qualifying match.

The season refers to qualifying match duration that is opened for the user account to participate in during a duration.

Exemplarily, the client controls the virtual character of the user account to participate in the qualifying match of the qualifying mode; in response to that the user account successfully participates in the qualifying match of the qualifying mode, display a journey value obtained by the user account in the current season for participating in the qualifying match of the qualifying mode.

Step 308: In response to that the journey value reaches a level threshold, display an obtained journey reward corresponding to a level threshold.

Exemplarily, in response to that the user account successfully participates in the qualifying match of the qualifying mode, display a journey value obtained by the user account in a current season for participating in the qualifying match; in response to that the journey value obtained by the user account reaches the level threshold set in the current season, the user account obtains the journey reward corresponding to the level threshold.

The journey reward refers to an exclusive reward obtained by the user account in the current season for participating in the qualifying mode.

The level threshold refers to the threshold corresponding to different journey levels set in the current season. The journey level refers to that the entire journey of the current season is divided into several levels, and each level corresponds to a different threshold. The journey level in the current season corresponds to different level thresholds, and different level thresholds correspond to different journey rewards.

For example, the journey level in the current season is divided into ten levels, and each level corresponds to a different level threshold, i.e., each level requires different journey values. For example, the third level threshold is 100, that is, after the journey value obtained by the user account through participating in the qualifying mode reaches 100, the user account can obtain the journey reward corresponding to the third level threshold.

In some embodiments, the journey reward corresponding to the level threshold includes at least one of the virtual ranking coin, virtual season badge, and virtual appearance reward, but is not limited to this, which is not limited by the present disclosure embodiment herein.

The virtual ranking coin refers to a virtual coin exclusive to the qualifying mode obtained by the user account in the current season through participating in the qualifying mode.

The virtual season badge refers to a virtual badge exclusive to the qualifying mode obtained by the user account in journey reward of the current season through participating in the qualifying mode.

The virtual appearance reward refers to a virtual appearance reward exclusive to the qualifying mode obtained by the user account in the journey reward of the current season through participating in the qualifying mode.

In conclusion, the method provided by this embodiment includes displaying the arena entrance of the ranking mode; by triggering the arena entrance, controlling the virtual character of the user account to participate in the qualifying match; in response to that the virtual character successfully participates, displaying a journey value obtained at a current season during participating in the qualifying match; in response to that the journey value reaches a level threshold, displaying an obtained journey reward corresponding to a level threshold. In the embodiment of the present disclosure, controlling the virtual character of the user account to participate in the qualifying match in the current season can obtain an additional journey reward in the current season. By providing the additional exclusive reward, the participation rate of a user is improved, so as to increase the resource utilization rate of the server.

FIG. 4 is a flowchart of user interface display according to an exemplary embodiment of the present disclosure. The method can be executed by the terminal in the system or the client on the terminal as shown in FIG. 2. The method includes the following steps:

Step 402: Display an arena entrance of a qualifying mode.

The qualifying mode is one of at least two match modes provided by the client, and the qualifying mode is an arena mode for determining a gaming competence rank of a user account in a ranking list.

Step 404: In response to a trigger operation on the arena entrance, control a virtual character of a user account to participate in a qualifying match.

Exemplarily, by triggering the arena entrance of the qualifying mode by the user, the client may control the virtual character of the user account to participate in the qualifying match of the qualifying mode.

In some embodiments, the user account may own multiple virtual characters; after triggering the arena entrance of the qualifying mode, the client may control one virtual character of the user account to participate in the qualifying match of the qualifying mode.

Step 406: In response to successfully participating in the qualifying match, display a sum of journey values obtained in the current season during participating in at least one qualifying match; and/or, display a single journey value obtained in the current season during participating in a single qualifying match.

Exemplarily, the client controls the virtual character of the user account to participate in the qualifying match of the qualifying mode; in response to that the virtual character successfully participates in the single qualifying match of the qualifying mode, display a single journey value obtained by the user account in the current season for participating in the qualifying match of the qualifying mode. That is, each qualifying match of the current season corresponds to a single journey value; display for the single journey value can enable the user to rapidly know the journey value quantity obtained in the current qualifying match, to improve the broadcast efficiency of the information. In response to that the virtual character successfully participates in multiple qualifying matches of the qualifying mode, display a sum of journey values obtained by the user account in the current season for participating in the qualifying match of the qualifying mode, i.e., when displaying the journey value, the sum of the journey values accumulated of all qualifying matches corresponding to the current season can also be displayed.

For example, in response to that the virtual character successfully participates in three qualifying matches of the qualifying mode, display a sum of the three journey values obtained by the user account in the current season for participating in the qualifying matches of the qualifying mode.

In one embodiment, in response to that the user account successfully participates in at least one qualifying match of the qualifying mode, display the sum of the journey values, at a settlement interface, and the journey reward received and the journey reward to be received in the current season.

Figure 5:
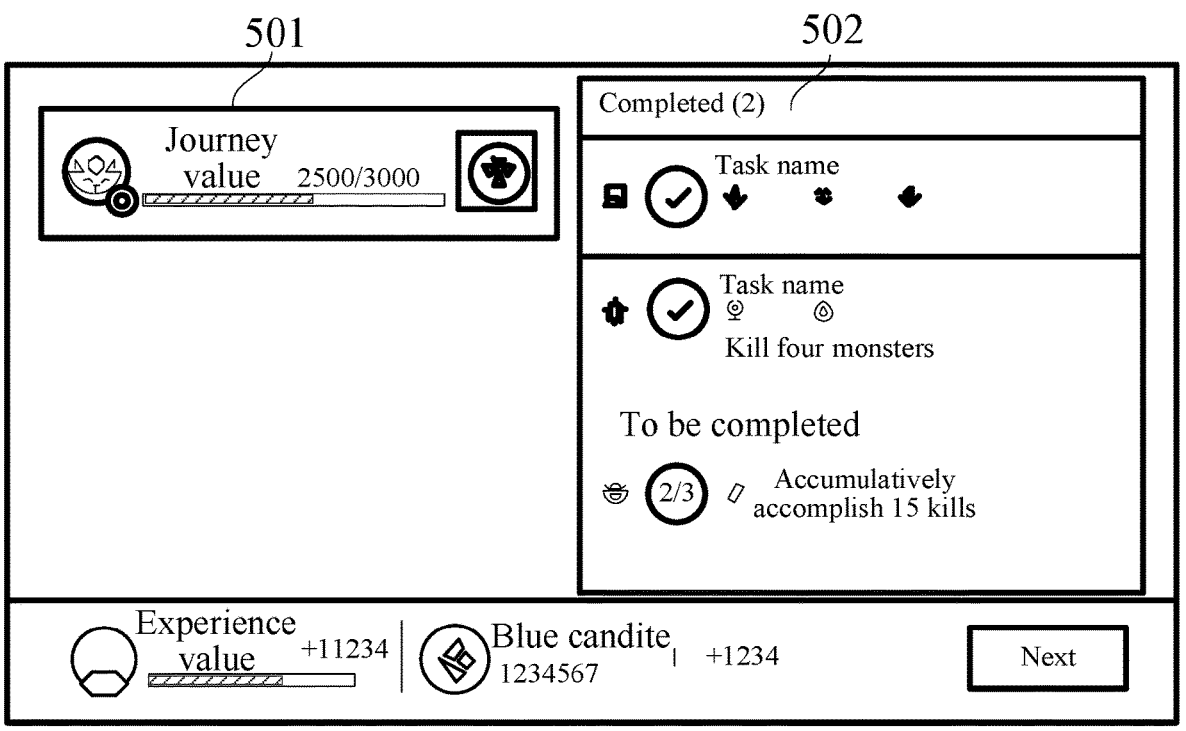
FIG. 5 is a schematic diagram of a settlement interface according to an exemplary embodiment of the present disclosure.

The settlement interface refers to an interface that is presented at the end of the qualifying match in which the user account participates in to settle the score of this qualifying match. Referring to FIG. 5, the settlement interface includes a journey value region 501 and a task list region 502. The journey value region 501 displays the sum of the journey values obtained in the current season during participating at least one qualifying match of the qualifying mode. The task list region 502 displays a completed task, a received journey reward, and a journey reward to be received.

For example, in response to that the user account participates in five qualifying matches of the qualifying mode, display the sum of the journey values obtained in the current season in the five qualifying matches participated in by the user account on the journey value region 501 on the settlement interface of the qualifying matches of the qualifying mode.

That is, after the user account completes a qualifying match, the sum of journey values is displayed on the settlement interface corresponding to the qualifying match, so that the user can quickly know the journey progress of the current season after completing the qualifying match, without opening the corresponding season activity page of the journey for information query, reducing the quantity of operations received by the terminal, and improving the efficiency of man-computer interaction efficiency.

Figure 6:
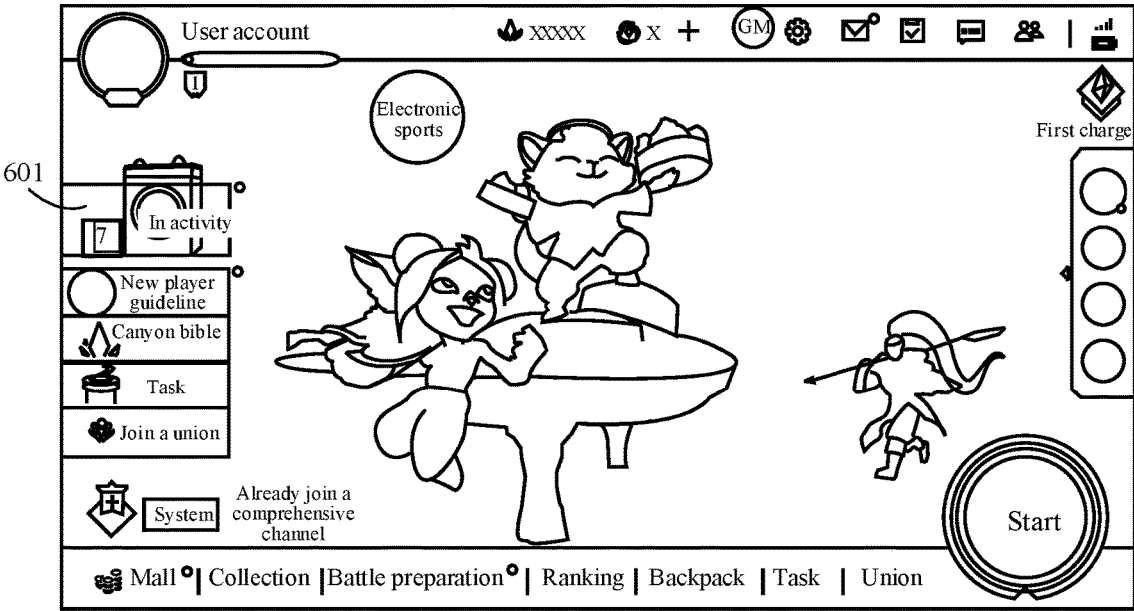
FIG. 6 is a schematic diagram of a season activity page according to an exemplary embodiment of the present disclosure.

In one embodiment, in response to that the user account successfully participates in at least one qualifying match of the qualifying mode, as shown in FIG. 6, display the entrance 601 of the season activity page in the current season, display the entrance 601 of the season activity page at a left side of the user interface, and the season activity page entrance 601 displays the sum of the journey values obtained in the current season during participating in at least one qualifying match of the qualifying mode, that is, displaying the sum of the journey values on the season activity page entrance of the current season.

The season activity page entrance 601 refers to an entrance entering the current season detailed information page, that is, the user can trigger the season activity page entrance 601 to display the detailed information of the current season journey.

In some embodiments, the season activity page entrance 601 can be suspended in the shape of circle, square, diamond and other shapes on at least one of the user main interface, the game mode selection interface, and the qualifying match interface, but is not limited to this, which is not limited by the embodiment of the present disclosure.

For example, in response to that the user account participates in five qualifying matches of the qualifying mode, display, on the season activity page entrance 601, the sum of the journey values obtained in the current season when the user account participates in the five qualifying matches.

Exemplarily, the season activity page entrance has three expression forms.

Figure 7:
FIG. 7 is a schematic diagram of a season activity page according to an exemplary embodiment of the present disclosure.

In some embodiments, as shown in FIG. 7, it shows the expression form of the season activity page entrance 700 when the user account has a reward to be received in the current season, that is, the progress value of the journey value obtained by the user account in the current season is displayed on the season activity page entrance 700 of the current season, and a special effect is displayed at the season activity page entrance 700.

In some embodiments, the special effect of the season activity page entrance 700 includes, but not limited to, at least one of the highlighting, bubble display and surround special effect, which is not limited by the embodiment of the present disclosure herein.

Figure 8:
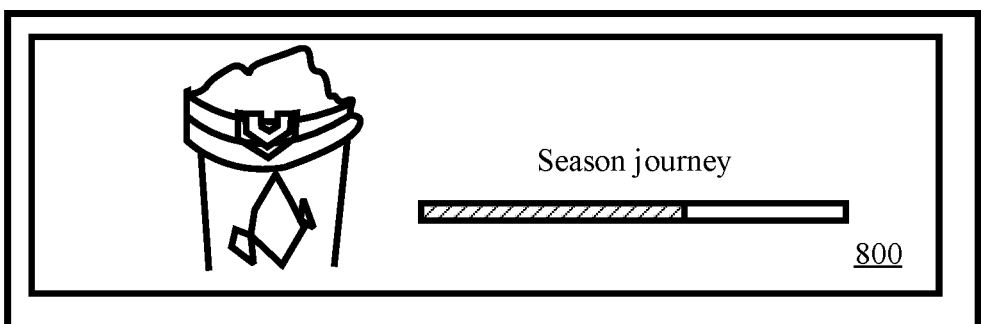
FIG. 8 is a schematic diagram of a season activity page according to an exemplary embodiment of the present disclosure.

In some embodiments, FIG. 8 shows a schematic expression mode of the season activity page entrance 800 when the user account has no reward to be received in the current season, that is, only the progress value of the journey value obtained in the current season is displayed on the season activity page entrance 800.

Figure 9:
FIG. 9 is a schematic diagram of a season activity page according to an exemplary embodiment of the present disclosure.

In some embodiments, FIG. 9 shows the expression form of the season activity page entrance 900 when the user account receives all the rewards in the current season. The completion label is displayed on the season activity page entrance 900 of the current season.

Exemplarily, by displaying the sum of the journey values on the season activity page entrance, the user can quickly understand the progress of the journey in the current season without entering the season activity page for information query, which improves the efficiency of user information obtaining and reduces the data processing amount of the terminal for interaction operations.

In one embodiment, in response to that the user account participates in the single qualifying match and wins in the single qualifying match, display a first quantity of the journey values obtained in the current season during participating in the single qualifying match. In response to that the user account participates in the single qualifying match and loses in the single qualifying match, display a second quantity of the journey values in the current season during participating in the single qualifying match; the first quantity is less than or equal to the second quantity. That is, by distinguishing the quantity of the journey values obtained between wins and losses, the user is encouraged to win in the qualifying match, so that the user account can improve the season journey level as soon as possible, thus reducing the overall data processing volume of the server.

For example, in response to that the client controls the virtual character of the user account to participate in the qualifying match of the qualifying mode and in response to that the virtual character wins in the qualifying match of the qualifying mode, the journey value obtained by the user account in the current season is 30; in response to that the virtual character losses in the single qualifying match, the journey value obtained by the user account in the current season is 20.

In one embodiment, in response to that the virtual character successfully participates in the qualifying match in a first duration of the current season, display an addition journey value obtained in the first duration during participating in the qualifying match; the addition journey value is greater than a single journey value obtained by the virtual character in a second duration except the first duration, and the second duration is a duration in the current season except the first duration. That is, the current season is divided by the first duration and the second duration, and different journey value rewards are provided for different durations, so that the user activity can be scheduled according to an actual demand, so as to load balance the server resources.

For example, in response to that the virtual character successfully participates in the qualifying match of the qualifying mode in the first duration of the current season, the first duration can be set as a weekend, that is, 1.5 times of the journey values can be obtained when the virtual character participates in the qualifying match of the qualifying mode in the weekend duration of the current season.

In one embodiment, in response to that the qualifying matches participated in by the user account are first n qualifying matches in the first duration of the current season, display an addition journey value obtained in the first duration during participating in the qualifying match, n being a positive integer.

For example, in response to that the user account successfully participates in the qualifying match of the qualifying mode in the first duration of the current season, the first duration can be set as a weekend, i.e., 1.5 times of the journey values can be obtained when the user account participates in the front n qualifying matches of the qualifying mode in the weekend duration of the current season. In the weekend duration of the current season, the journey value obtained from the qualifying matches after the first n qualifying matches of the qualifying mode is the same as that obtained at the second duration.

In some embodiments, the n qualifying matches with an addition journey value may be only the first n matches, or, may be set as random n matches within the first duration, but are not limited to this, which is not limited herein by the embodiment of the present disclosure.

That is, setting some specified qualifying matches in the first duration obtains the addition journey value, which improves the diversity of the journey value obtaining, so as to ensure user activity and prevent the server resources from being wasted.

In one embodiment, in response to that the virtual character successfully participates in the qualifying match in the second duration, determine a hidden credit; and based on the hidden credit, determine a session number n of the qualifying match that obtains the addition journey value in the first duration.

In some embodiments, in response to that the virtual character participates in the qualifying match in the second duration and wins in the qualifying match, determine a third quantity of the hidden credits; and in response to that the virtual character participates in the qualifying match in the second duration and loses in the qualifying match, determine a fourth quantity of the hidden credits; the third quantity is less than the fourth quantity.

The hidden credit is the credit determined by the performance of the virtual character in the qualifying match in the second period, and the credit is not displayed on the user interface. The setting of hidden credits in the qualifying match is shown in Table 1.

Exemplarily, as shown in Table 1, the virtual character participates in the qualifying match of the qualifying mode in the second duration. In the second duration, 5 hidden credits can be obtained upon each win of the qualifying match; 15 hidden credits can be obtained upon each loss of the qualifying match. 30 hidden credits would be lost upon each up-level of the virtual character in the qualifying match. At the same time, in the second duration, 10 hidden credits can be obtained upon each participation of the qualifying match of the qualifying mode for the first time each day. For example, if the hidden credit owned by the user account exceeds 30, one qualifying match with the addition journey value can be obtained.

TABLE 1

| Hidden credit table | |
| --- | --- |
| Performance of virtual character | Credit |
| Win a qualifying match | 5 |
| Lose a qualifying match | 15 |
| Promote by one level | −30 |
| Log-in addition credit | 10/day |

In one embodiment, in response to that the user account has not yet participated in the qualifying match in the first duration, display prompt information; the prompt information is used for prompting the user account to participate in the qualifying match in the first duration.

For example, if the user account does not participate in a qualifying match during the first duration of the current season, the server sends prompt information to the terminal for indicating that the first duration of the user account in the current season is started. For example, during the duration from 8:00 PM on Friday to 0:00 PM on Monday, the user account may obtain 1.5 times of the journey value for the first 5 qualifyings played. If the user account does not participate in the qualifying match after 8:00 PM on Friday, the terminal will receive prompt information.

That is, the quantity of matches that can obtain the addition journey value in the first duration is determined by the participation condition of the qualifying matches in the second duration, so as to improve the diversity of the quantity of matches.

As can be understood that the prompt information would only be received when the client starts a terminal notification permission for the game.

Step 408: In response to that the journey value reaches a level threshold, display an obtained journey reward corresponding to a level threshold.

Exemplarily, in response to that the user account successfully participates in the qualifying match of the qualifying mode, display a journey value obtained by the user account in a current season for participating in the qualifying match; in response to that the journey value obtained by the user account reaches the level threshold set in the current season, the user account obtains the journey reward corresponding to the level threshold.

In some embodiments, the journey reward corresponding to the level threshold includes at least one of the virtual ranking coin, virtual season badge, and virtual appearance reward, but is not limited to this, which is not limited by the present disclosure embodiment herein.

In conclusion, the method provided by this embodiment includes displaying the arena entrance of the ranking mode; by triggering the arena entrance, controlling the virtual character of the user account to participate in the qualifying match; in response to that the virtual character successfully participates, displaying a journey value obtained at a current season during participating in the qualifying match; in response to that the journey value reaches a level threshold, displaying an obtained journey reward corresponding to a level threshold.

The embodiment of the present disclosure provides the display position of the journey value and the obtaining conditions of the journey values in different scenes; by controlling the virtual character of the user account to participate in the qualifying match in the current season, in response to that the user account participates in the qualifying match, it can additionally obtain an additional journey reward. By providing the additional exclusive reward, the participation rate of the user is improved, so as to increase the resource utilization rate of the server.

Based on the example embodiment of FIG. 4, the current season provides a "happy weekend" mode. The "happy weekend" mode refers to an activity mode that is timely and in a time-limit manner opened in the current season. For example, in the current season, the "happy weekend" mode time is between 8:00 PM on Friday and 0:00 PM on Monday.

Exemplarily, in response to that the user account successfully participates in the qualifying match in the "happy weekend" mode duration in the current season, display an addition journey value obtained in the "happy weekend" mode duration during participating in the qualifying match; the addition journey value is greater than a single journey value obtained by the user account in a second duration except the "happy weekend" mode duration.

For example, in response to that the user account successfully participates in the qualifying match of the qualifying mode in the "happy weekend" mode duration of the current season, the "happy weekend" mode duration is set as a weekend, i.e., 1.5 times of the journey values can be obtained when the user account participates in the qualifying matches of the qualifying mode in the weekend duration of the current season.

In one embodiment, in response to that the user account successfully participates in the front n qualifying matches of the qualifying mode in the "happy weekend" mode duration in the current season, display an addition journey value obtained in the "happy weekend" mode duration during participating in the qualifying match; n is a positive integer.

For example, in response to that the user account successfully participates in the qualifying match of the qualifying mode in the "happy weekend" mode duration of the current season, the "happy weekend" mode duration can be set as a weekend, i.e., 1.5 times of the journey values can be obtained when the user account participates in the front n qualifying matches of the qualifying mode in the weekend duration of the current season. In the weekend duration of the current season, the journey value obtained from the qualifying matches after the first n qualifying matches of the qualifying mode is the same as that obtained at the second duration.

In some embodiments, the n qualifying matches with an addition journey value may be only the first n matches, or, may be set as random n matches within the first duration, but are not limited to this, which is not limited herein by the embodiment of the present disclosure.

In one embodiment, in response to that the user account successfully participates in the qualifying match in the second duration, determine a hidden credit; and based on the hidden credit, determine a session number n of the qualifying match that obtains the addition journey value in the "happy weekend" mode duration.

In some embodiments, in response to that the user account participates in the qualifying match in the second duration and wins in the qualifying match, determine a third quantity of the hidden credits; and in response to that the user account participates in the qualifying match in the second duration and loses in the qualifying match, determine a fourth quantity of the hidden credits; the third quantity is less than the fourth quantity.

The hidden credit is the credit determined by the performance of the user account in the qualifying match in the second period, and the credit is not displayed on the user interface. The setting of hidden credits in the qualifying match is shown in Table 2.

TABLE 2

| Hidden credit table | |
| --- | --- |
| Performance of virtual character | Credit |
| Win a qualifying match | 5 |
| Lose a qualifying match | 15 |
| Promote by one level | −30 |
| Log-in addition credit | 10/day |

Exemplarily, as shown in Table 2, the virtual character participates in the qualifying match of the qualifying mode in the second duration. In the second duration, 5 hidden credits can be obtained upon each win of the qualifying match; 15 hidden credits can be obtained upon each loss of the qualifying match. 30 hidden credits would be lost upon each up-level of the virtual character in the qualifying match. At the same time, in the second duration, 10 hidden credits can be obtained upon each participation of the qualifying match of the qualifying mode for the first time each day. For example, if the hidden credit owned by the user account exceeds 30, one qualifying match with the addition journey value can be obtained.

In one embodiment, in response to that the user account does not participate in the qualifying match in the "happy weekend" mode duration, display prompt information; the prompt information is used for prompting the user account to participate in the qualifying match in the "happy weekend" mode duration.

For example, if the user account does not participate in a qualifying match during the "happy weekend" mode duration of the current season, the server sends prompt information to the terminal for indicating that the "happy weekend" mode duration of the user account in the current season is started. For example, during the duration from 8:00 PM on Friday to 0:00 PM on Monday, the user account may obtain 1.5 times of the journey value for the first 5 qualifyings played. If the user account does not participate in the qualifying match after 8:00 PM on Friday, the terminal will receive prompt information.

As can be understood that the prompt information would only be received when the client starts a terminal notification permission for the game.

To sum up, the method provided in this embodiment includes setting the "happy weekend" mode in the current season. By controlling the virtual character of the user account to participate in the qualifying match in the "happy weekend" mode duration of the current season, the user account can obtain the addition journey value in the "happy weekend" mode duration of the current season.

At the same time, based on that the performance of the user account that participates in the qualifying match in the second duration, determine the hidden credits; and in response to that the user account participates in the qualifying match and loses, obtain more the hidden credits. In response to that the user account participates in the qualifying match and wins, obtain fewer the hidden credits. Based on the hidden credits, determine a session number of the qualifying match where the user account obtains the addition journey value in the "happy weekend" mode duration, so as to ensure that the user account can still obtain enough additional journey values in response to that the user participates in the qualifying match and loses. By obtaining the additional exclusive reward, the user participation rate in the qualifying mode is increased, so as to increase the resource utilization rate of the server.

FIG. 10 is a flowchart of user interface display according to an exemplary embodiment of the present disclosure. The method can be executed by the terminal in the system or the client on the terminal as shown in FIG. 2. The method includes the following steps:

Step 1002: Display an arena entrance of a qualifying mode.

The qualifying mode is one of at least two match modes provided by the client, and the qualifying mode is an arena mode for determining a gaming competence rank of a user account in a ranking list.

In some embodiments, the match mode provided by the client includes at least two of the matching race, the qualifying, and the peak race, but is not limited to this, which is not limited by the present disclosure embodiment herein.

Step 1004: In response to a trigger operation on the arena entrance, control a virtual character of a user account to participate in a qualifying match.

Exemplarily, by triggering the arena entrance of the qualifying mode, the client may control the virtual character of the user account to participate in the qualifying match of the qualifying mode.

In some embodiments, the user account may own multiple virtual characters; after triggering the arena entrance of the qualifying mode, the client may control one virtual character of the user account to participate in the qualifying match of the qualifying mode.

Step 1006: In response to successfully participating, display a journey value obtained at a current season during participating in the qualifying match.

The journey value refers to an exclusive name of experiences or credits obtained by the user account in the current season by participating in the qualifying match. The obtaining of the journey value is related to the times of the user account to participate in the qualifying match in the current season. For example, the user account can obtain a certain quantity of journey values for each qualifying match.

Exemplarily, the client controls the virtual character of the user account to participate in the qualifying match of the qualifying mode; in response to that the virtual character successfully participates in the qualifying match of the qualifying mode, display a journey value obtained by the user account in the current season for participating in the qualifying match of the qualifying mode.

Step 1008: In response to that the journey value reaches the level threshold, display at least one of a virtual ranking coin, a virtual season badge, and a virtual appearance reward corresponding to the level threshold.

Exemplarily, in response to that the user account successfully participates in the qualifying match of the qualifying mode, display a journey value obtained by the user account in a current season for participating in the qualifying match; in response to that the journey value obtained by the user account reaches the level threshold set in the current season, the user account obtains the journey reward corresponding to the level threshold.

In some embodiments, the journey reward corresponding to the level threshold includes at least one of the virtual ranking coin, virtual season badge, and virtual appearance reward, but is not limited to this, which is not limited by the present disclosure embodiment herein.

One embodiment includes displaying an entrance of a ranking mall exclusive to the qualifying mode; in response to a trigger operation on the entrance of the ranking mall, displaying a mall interface of the ranking mall exclusive to the qualifying mode, the mall interface of the ranking mall comprising at least one virtual item purchasable using the virtual ranking coin.

Figure 11:
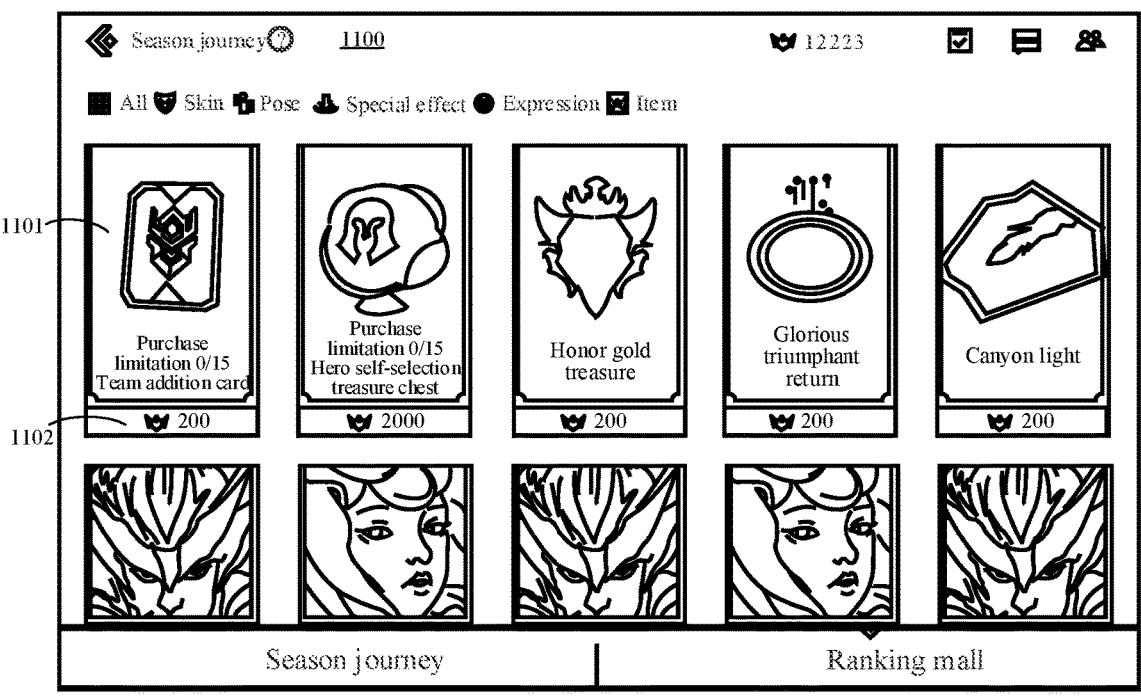
FIG. 11 is a schematic diagram of a ranking mall page according to an exemplary embodiment of the present disclosure.

For example, the client controls the virtual character of the user account to participate in the qualifying match of the qualifying mode to obtain the journey value; in response to that the journey value reaches a level threshold, the user account obtains the virtual ranking coin corresponding to the level threshold. The virtual ranking coins can be used for purchasing the virtual object in the mall interface of the ranking mall exclusive to the qualifying mode; FIG. 11 shows the schematic of the mall interface 1100 according to an exemplary embodiment of the present disclosure. The price 1102 corresponding to the virtual object 1101 that can be purchased is displayed in the mall interface 1100 of the ranking mall exclusive to the qualifying mode.

Exemplarily, the ranking mall corresponding to the season journey is introduced so as to enrich the diversity of obtaining modes of the virtual items.

In some embodiments, The virtual objects that can be purchased in the mall interface includes at least one of a virtual profile photo, a virtual expression, virtual skin, a return-to-city special effect, a home-guard special effect and a virtual team flag, but is not limited to this, which is not limited by the present disclosure embodiment herein.

In one embodiment, display an entrance of personal information of the user account; in response to a trigger operation on the entrance of the personal information, display an account information page of the user account, and display, in the account information page, the virtual season badge obtained by the user account in the current season. The journey condition of the user account in the current season is labeled through the virtual season badge, so as to facilitate the user account to search and view the journey condition of the historical season to improve the storage efficiency of the account information.

Figure 12:
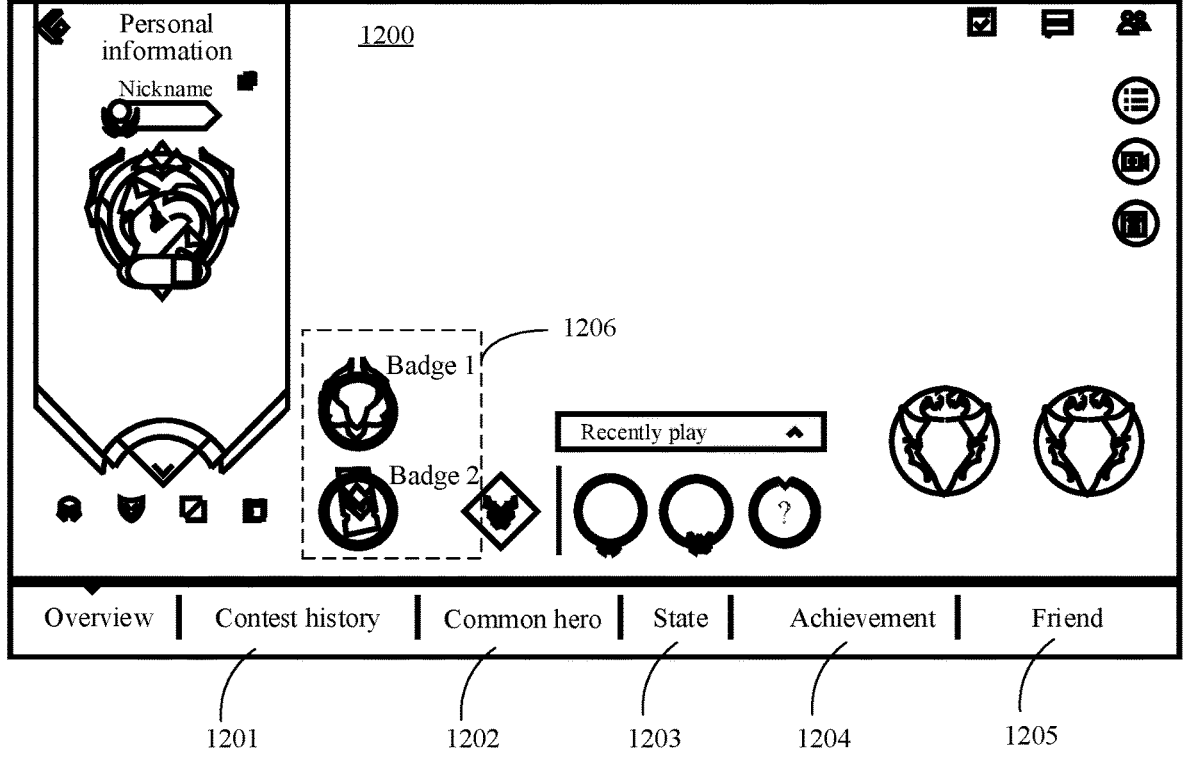
FIG. 12 is a schematic diagram of an account information page according to an exemplary embodiment of the present disclosure.

FIG. 12 shows a schematic diagram of the account information page 1200 according to an exemplary embodiment of the present disclosure. The account information page 1200 further includes a contest historical entrance 1201, this user account common hero entrance 1202, this user account state information 1203, this user account obtained achievement entrance 1204, and friend relationship entrance 1205. In the account information page 1200, the basic information of the user account and the virtual season badge 1206 obtained by the user account in the current season are displayed, such as season badge 1 and season badge 2.

One embodiment includes displaying an entrance of a virtual collection exclusive to the qualifying mode; in response to a trigger operation on the entrance of the virtual collection, displaying the virtual appearance reward obtained by the user account in the current season; and/or, in response to a trigger operation on the entrance of the virtual collection, displaying an exclusive virtual item purchased by the user account using the virtual ranking coin; the exclusive virtual item is a virtual item exclusive to the qualifying mode in the current season. The virtual appearance reward can be obtained through the user account in the current season; the virtual item can be purchased through the user account using virtual ranking coins from the ranking mall, or through the user account in the current season.

In some embodiments, the virtual appearance reward includes at least one of a virtual profile photo, a virtual expression, virtual skin, a return-to-city special effect, a home-guard special effect and a virtual team flag, but is not limited to this, which is not limited by the present disclosure embodiment herein.

Figure 13:
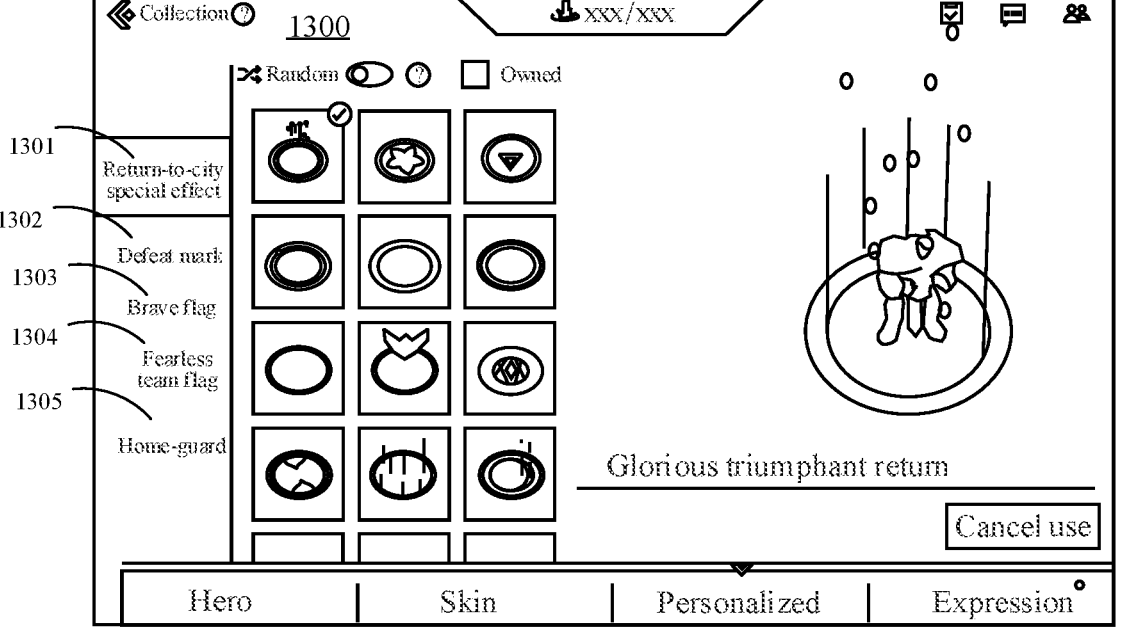
FIG. 13 is a schematic diagram of a virtual collection page according to an exemplary embodiment of the present disclosure.

Exemplarily, the page of the virtual collection can display at least one of a hero type collection, a virtual skin type collection, a personalized collection, a virtual expression type collection, etc. FIG. 13 is a schematic diagram of a personalized collection page 1300 according to an exemplary embodiment of the present disclosure. The personalized collection page 1300 may include at least one of a return-to-city special effect 1301, a defeat mark 1302, a brave flag 1303, a fearless team flag 1304, and a home-guard special effect 1305, but is not limited to this, which is not limited by the present disclosure embodiment herein. The user account can be loaded onto the virtual object by selecting the virtual item on the virtual collection.

One embodiment includes displaying an entrance of a season activity page of the current season; in response to a trigger operation on the entrance of the season activity page of the current season, displaying the season activity page, displaying, on the season activity page, the journey reward obtained by the user account in the current season, and/or obtaining the journey reward upon meeting a next level threshold. That is, an independent season activity page is used for displaying a journey reward completely, so as to facilitate browsing of complete information and improve integrity of information delivered.

In conclusion, the user face display method provided by this embodiment includes displaying the arena entrance of the ranking mode; by triggering the arena entrance, controlling the virtual character of the user account to participate in the qualifying match; in response to that the virtual character successfully participates, displaying a journey value obtained at a current season during participating in the qualifying match; in response to that the journey value reaches the level threshold, displaying the obtained virtual ranking coin, virtual season badge, and virtual appearance reward corresponding to the level threshold; displaying the virtual season badge on the account information page, the virtual ranking coin being used for purchase the virtual item in the ranking mall, and displaying the virtual appearance reward and the virtual item purchased in the ranking mall at the virtual collection page.

In the embodiment of the present disclosure, by controlling the virtual character of the user account to participate in the qualifying match in the current season, the additional virtual ranking coin, virtual season badge, and virtual appearance reward are obtained in the current season and are displayed in the virtual collection page, the season activity page, and the account information page, so that the virtual character links the qualifying mode to the virtual mall, personal information, virtual collection, and season activity during the process of participating in the qualifying match, so that the user operation is more convenient, improves user experience, and further improves user participation rate, so as to increase the server resource utilization rate.

In a specific example, for the qualifying mode, it provides the exclusive season journey system and the ranking mall, personal information system, virtual collection system, personal information system, season activity page, and happy weekend mode system associated with the exclusive season journey system.

Season journey system. The season journey system is attached to the qualifying mode system. In response to that the user account sensor participates in the qualifying mode, the user account obtains the journey value in the current season provided by the season journey system. After the journey value obtained by the user account reaches a certain level, the journey reward in the season journey system can be obtained. Regardless of whether the virtual character of the user account wins or loses a qualifying match, the user account can obtain the journey value in the current season provided by the season journey system.

As shown in FIG. 1, the season journey interface displays the total amount of the ranking coins obtained by the user account during the current season. For example, the total amount of the ranking coins obtained by the user account is 12223. The journey value obtained by the user account in the current season is displayed in the season journey page. For example, the total number of the journey value obtained by user account in the current season in this page is 88888. Levels 1-10 in the season journey page respectively represent a season journey level. When the journey value reaches a level threshold corresponding to a level, the user account obtains a journey reward corresponding to the level threshold. For example, a check mark displayed on the journey reward corresponding to level 1 is used for indicating that the user account has successfully received the journey reward corresponding to level 1.

The ranking mall. Display a ranking mall interface exclusive to the qualifying mode, and the mall interface of the ranking mall includes at least one virtual item purchasable using the virtual ranking coin.

For example, the virtual character of the user account provides the journey value obtained during participating in the qualifying match of the qualifying mode; in response to that the journey value reaches a level threshold, the user account obtains the virtual ranking coin in the journey reward corresponding to the level threshold. The virtual ranking coins can be used for purchasing the virtual item in the mall interface of the ranking mall exclusive to the qualifying mode; the mall interface of the ranking mall exclusive to the qualifying mode is as shown in FIG. 11. The price corresponding to the virtual item that can be purchased is displayed in the mall interface.

The virtual objects that can be purchased in the mall interface includes at least one of a virtual profile photo, a virtual expression, virtual skin, a return-to-city special effect, a home-guard special effect and a virtual team flag, but is not limited to this, which is not limited by the present disclosure embodiment herein.

Personal information system. Display an account information page of the user account, and display, in the account information page, the virtual season badge obtained by the user account in the current season.

As shown in FIG. 12, the account information page further includes a contest historical entrance, this user account common hero entrance, this user account state information, this user account obtained achievement entrance, and friend relationship entrance. In the account information page, the basic information of the user account and the virtual season badge obtained by the user account in the current season are displayed, such as season badge 1 and season badge 2.

Virtual collection system. Display a virtual collection system page exclusive to the qualifying mode. The virtual collection system displays the collection type reward obtained by the user account in the current season.

The collection type reward can be purchased from the ranking mall using the virtual ranking coin through the user account, or obtained through the user account in the current season.

As shown in FIG. 13, the page of the virtual collection system displays a hero type collection, a virtual skin type collection, a personalized collection, and a virtual expression type collection. The personalized collection page may include at least one of a return-to-city special effect, a defeat mark, a brave flag, a fearless team flag, and a home-guard special effect, but is not limited to this, which is not limited by the present disclosure embodiment herein. The user account can be loaded onto the virtual object by selecting the virtual item on the virtual collection.

Season activity page. Display the user interface; display the entrance of the season activity page at the left side of the user interface. The entrance of the season activity page displays the sum of the journey values obtained in the current season during participating in at least one qualifying match of the qualifying mode. At the same time, by triggering the season activity page entrance, display the detailed information of the current season journey. Display, on the season activity page, the journey reward obtained by the user account in the current season, and/or obtain the journey reward upon meeting a next level threshold.

Display, on the season activity page entrance, the sum of the journey values obtained in the current season when the user account participates in the qualifying matches. The season activity page entrance has three expression forms:

exemplarily, with reference to FIG. 7, when the user account has a reward to be received in the current season; the progress value of the journey value obtained by the user account in the current season is displayed on the season activity page entrance of the current season, and a special effect is displayed at the season activity page entrance.

In some embodiments, the special effect of the season activity page entrance includes, but not limited to, at least one of the highlighting, bubble display and surround special effect, which is not limited by the embodiment of the present disclosure herein.

In some embodiments, as shown in FIG. 8, when the user account has no reward to be received in the current season, only the progress value of the journey value obtained in the current season is displayed on the season activity page entrance.

In some embodiments, as shown in FIG. 9, when the user account receives all the rewards in the current season, the completion label is displayed on the season activity page entrance of the current season.

Figure 14:
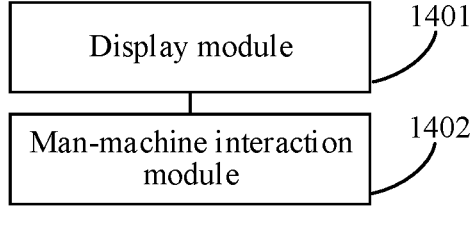
FIG. 14 is a block diagram of a user interface display apparatus according to an exemplary embodiment of the present disclosure.

FIG. 14 is a schematic structural diagram of a user interface display apparatus according to an exemplary embodiment of the present disclosure. The apparatus may be implemented as an entire or a part of a computer device by using software, hardware, or a combination thereof. The apparatus includes:

a display module 1401, configured to display an arena entrance of a qualifying mode, the qualifying mode being one of at least two match modes provided by a client, and the qualifying mode being an arena mode for determining a gaming competence rank of a user account in a ranking list;

a man-machine interaction module 1402, configured to, in response to a trigger operation on the arena entrance, control a virtual character of the user account to participate in the qualifying match;

the display module 1401, configured to, in response to successfully participating in the qualifying match, display a journey value obtained in a current season during participating in the qualifying match, the journey value being a numeral value related to times of participating in qualifying matches in the current season by the user account; and the display module 1401, configured to, in response to that the journey value reaches a level threshold, display an obtained journey reward corresponding to the level threshold.

In one embodiment, the display module 1401 is configured to display a sum of journey values obtained in the current season during participating in at least one qualifying match.

In one embodiment, the display module 1401 is configured to display a single journey value obtained in the current season during participating in a single qualifying match.

In one embodiment, the display module 1401 is configured to display a journey value sum at a settlement interface.

In one embodiment, the display module 1401 is configured to display the journey value sum at a season activity page entrance of the current season.

In one embodiment, the display module 1401 is further configured to, in response to that the user account participates in the single qualifying match and wins in the single qualifying match, display a first quantity of the journey values obtained in the current season during participating in the single qualifying match.

In one embodiment, the display module 1401 is further configured to, in response to that the user account participates in the single qualifying match and loses in the single qualifying match, display a second quantity of the journey values obtained in the current season during participating in the single qualifying match;

the first quantity being less than or equal to the second quantity.

In one embodiment, the display module 1401 is further configured to, in response to successfully participating in the qualifying match by the user account in a first duration of the current season, display an addition journey value obtained in the first duration during participating in the qualifying match;

the addition journey value being greater than a single journey value obtained by the user account in a second duration, and the second duration being a duration in the current season except the first duration.

In one embodiment, the display module 1401 is also configured to, in response to that the qualifying matches participated in by the user account are first n qualifying matches in the first duration of the current season, display an addition journey value obtained in the first duration during participating in the qualifying match, n being a positive integer.

In one embodiment, the man-machine interaction module 1402 is configured to, in response to that the user account successfully participates in the qualifying match in the second duration, determine a hidden credit; and based on the hidden credit, determine a session number n of the qualifying match that obtains the addition journey value in the first duration.

In one embodiment, the man-machine interaction module 1402 is configured to, in response to that the user account participates in the qualifying match in the second duration and wins in the qualifying match, determine a third quantity of the hidden credits; and in response to that the user account participates in the qualifying match in the second duration and loses in the qualifying match, determine a fourth quantity of the hidden credits;

the third quantity being less than the fourth quantity.

In one embodiment, the display module 1401 is further configured to, in response to that the user account has not yet participated in the qualifying match in the first duration, display prompt information;

the prompt information being configured to prompt the user account to participate in the qualifying match in the first duration.

In one embodiment, the display module 1401 is further configured to, in response to that the journey value reaches a level threshold, display at least one of a virtual ranking coin, a virtual season badge, and a virtual appearance reward corresponding to the level threshold.

In one embodiment, the display module 1401 is further configured to display an entrance of a ranking mall exclusive to the qualifying mode.

In one embodiment, the man-machine interaction module 1402 is configured to, in response to a trigger operation on the entrance of the ranking mall, displaying a mall interface of the ranking mall exclusive to the qualifying mode, the mall interface of the ranking mall comprising at least one virtual item purchasable using the virtual ranking coin.

In one embodiment, the display module 1401 is also configured to display an entrance of personal information of the user account.

In one embodiment, the man-machine interaction module 1402 is configured to, in response to a trigger operation on the entrance of the personal information, display an account information page of the user account, and display, in the account information page, the virtual season badge obtained by the user account in the current season.

In one embodiment, the display module 1401 is also configured to display an entrance of a virtual collection exclusive to the qualifying mode.

In one embodiment, the man-machine interaction module 1402 is configured to, in response to a trigger operation on the entrance of the virtual collection, display the virtual appearance reward obtained by the user account in the current season.

In one embodiment, the man-machine interaction module 1402 is configured to, in response to a trigger operation on the entrance of the virtual collection, display an exclusive virtual item purchased by the user account using the virtual ranking coin.

The exclusive virtual item is a virtual item exclusive to the qualifying mode in the current season.

In one embodiment, the display module 1401 is also configured to display an entrance of a season activity page of the current season.

In one embodiment, the man-machine interaction module 1402 is configured to, in response to a trigger operation on the entrance of the season activity page of the current season, display the season activity page, display, on the season activity page, the journey reward obtained by the user account in the current season, and/or obtain the journey reward upon meeting a next level threshold.

Figure 15:
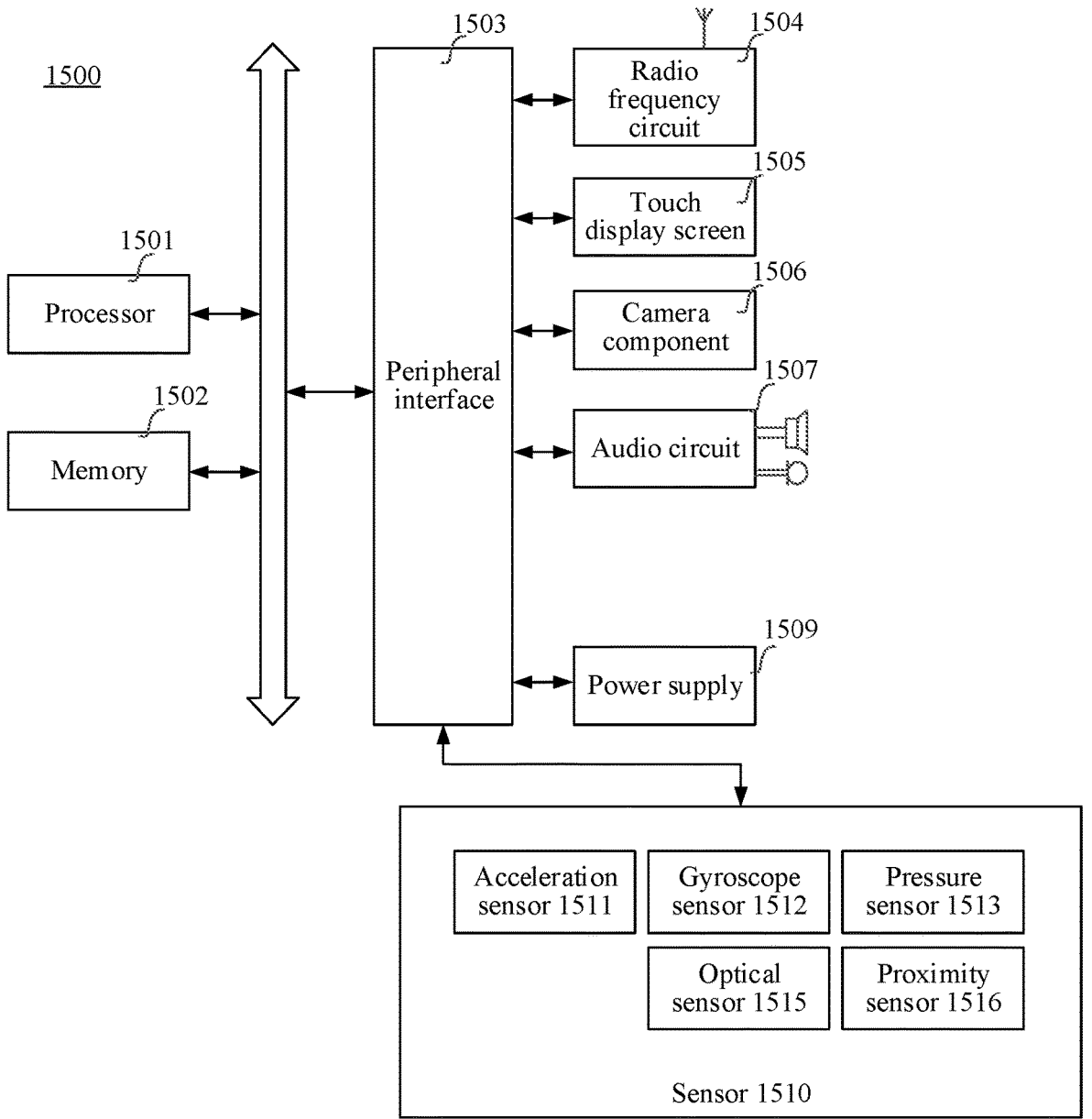
FIG. 15 is a schematic structural diagram of a computer device according to an exemplary embodiment of the present disclosure.

FIG. 15 is a structural block diagram of a computer device 1500 according to an exemplary embodiment of the present disclosure. The computer device 1500 may be a portable mobile terminal, such as: a smart phone, a tablet computer, a Moving Picture Experts Group Audio Layer III (MP3) player, and a Moving Picture Experts Group Audio Layer IV (MP4) player. The computer device 1500 may also be referred to as another name such as user equipment and a portable terminal.

Generally, the computer device 1500 includes: a processor 1501 and a memory 1502.

The processor 1501 may include one or more processing cores, for example, a 4-core processor or an 8-core processor.

The memory 1502 may include one or more computer-readable storage media. The computer-readable storage medium may be tangible and non-transient. In some embodiments, the non-transient computer-readable storage medium in the memory 1502 is configured to store at least one instruction, and the at least one instruction is configured to be executed by the processor 1501 to implement the method for displaying a virtual environment image provided in the embodiments of the present disclosure.

In some embodiments, the computer device 1500 may further include: a peripheral device interface 1503 and at least one peripheral device. Specifically, the peripheral device includes: at least one of a radio frequency (RF) circuit 1504, a touch display screen 1505, a camera component 1506, an audio circuit 1507, and a power supply 1509.

The peripheral interface 1503 may be configured to connect the at least one peripheral related to input/output (I/O) to the processor 1501 and the memory 1502.

The RF circuit 1504 is configured to receive and transmit an RF signal, also referred to as an electromagnetic signal. The RF circuit 1504 communicates with a communication network and other communication devices through the electromagnetic signal.

The touch display screen 1505 is configured to display a User Interface (UI). The UI may include a graph, text, an icon, a video, and any combination thereof.

The camera component 1506 is configured to capture images or videos.

The audio circuit 1507 is configured to provide an audio interface between the user and the computer device 1500.

The power supply 1509 is configured to supply power to components in the computer device 1500.

In some embodiments, the computer device 1500 further includes one or more sensors 1510. The one or more sensors 1510 include, but not limited to: an acceleration sensor 1511, a gyroscope sensor 1512, a pressure sensor 1513, an optical sensor 1515, and a proximity sensor 1516.

A person skilled in the art can understand that the structure shown in FIG. 15 does not constitute a limitation on the computer device 1500, and may include more or fewer components than shown in the figure, or combine some components, or adopt different component arrangements.

An embodiment of the present disclosure further provides a computer device, which includes: a processor and a memory, the memory storing at least one computer instruction, and the at least one computer instruction being loaded and executed by the processor to implement the user interface display method provided by each method embodiment.

An embodiment of the present disclosure further provides a computer storage medium. The computer-readable storage medium stores at least one computer instruction, the at least one one computer instruction being loaded and executed by a processor to implement the user interface display method provided by each method embodiment.

An embodiment of the present disclosure further provides a computer program product including a computer instruction, and the computer instruction is stored in a computer-readable storage medium. The computer instruction is read and executed, by a processor of a computer device, from the computer-readable storage medium, so that the computer device executes the user interface display method according to each method embodiment.

What is claimed is:

1. A user interface display method, executed by a terminal and comprising:

displaying an arena entrance of a qualifying mode, the qualifying mode being one of at least two match modes provided by a client, and the qualifying mode being an arena mode for determining a gaming competence rank of a user account in a ranking list;

in response to a trigger operation on the arena entrance, controlling a virtual character of the user account to participate in a qualifying match of the qualifying mode;

in response to successfully participating in the qualifying match, displaying a journey value obtained in a current season during participating in the qualifying match, the journey value being a numeral value related to times of participating in qualifying matches in the current season by the user account, wherein the displaying the journey value obtained in the current season during participating in the qualifying match comprises displaying a sum of journey values obtained in the current season during participating in at least one qualifying match; in response to successfully participating in the qualifying match by the user account in a first duration of the current season, displaying an addition journey value obtained in the first duration during participating in the qualifying match; the addition journey value being greater than a single journey value obtained by the user account in a second duration, and the second duration being a duration in the current season except the first duration, wherein the displaying the sum of journey values obtained in the current season during participating in the at least one qualifying match comprises at least one of: displaying the journey value sum at a settlement interface; or, displaying the journey value sum at a season activity page entrance of the current season; and in response to that the journey value reaches a level threshold, displaying an obtained journey reward corresponding to the level threshold.

2. The method according to claim 1, wherein the displaying the journey value obtained in the current season during participating in the qualifying match comprises at least one of:

displaying a sum of journey values obtained in the current season during participating in at least one qualifying match; or displaying a single journey value obtained in the current season during participating in a single qualifying match.

3. The method according to claim 2, wherein the displaying the single journey value obtained in the current season during participating in the single qualifying match comprises:

in response to that the user account participates in the single qualifying match and wins in the single qualifying match, displaying a first quantity of the journey values obtained in the current season during participating in the single qualifying match; and in response to that the user account participates in the single qualifying match and loses in the single qualifying match, displaying a second quantity of the journey values in the current season during participating in the single qualifying match;

the first quantity being less than or equal to the second quantity.

4. The method according to claim 1, further comprising: in response to that the qualifying matches participated in by the user account are first n qualifying matches in the first duration of the current season, displaying an addition journey value obtained in the first duration during participating in the qualifying match, n being a positive integer.

5. The method according to claim 4, further comprising:

in response to that the user account successfully participates in the qualifying match in the second duration, determining a hidden credit; and based on the hidden credit, determining a session number n of the qualifying match that obtains the addition journey value in the first duration.

6. The method according to claim 5, wherein the in response to that the user account successfully participates in the qualifying match in the second duration, determining the hidden credit, comprises:

in response to that the user account participates in the qualifying match in the second duration and wins in the qualifying match, determining a third quantity of the hidden credits; and in response to that the user account participates in the qualifying match in the second duration and loses in the qualifying match, determining a fourth quantity of the hidden credits;

the third quantity being less than the fourth quantity.

7. The method according to claim 1, further comprising: in response to that the user account has not yet participated in the qualifying match in the first duration, displaying prompt information; the prompt information being configured to prompt the user account to participate in the qualifying match in the first duration.

8. The method according to claim 1, wherein the in response to that the journey value reaches the level threshold, displaying the obtained journey reward corresponding to the level threshold comprises:

in response to that the journey value reaches the level threshold, displaying at least one of a virtual ranking coin, a virtual season badge, and a virtual appearance reward corresponding to the level threshold.

9. The method according to claim 8, further comprising: displaying an entrance of a ranking mall exclusive to the qualifying mode; and in response to a trigger operation on the entrance of the ranking mall, displaying a mall interface of the ranking mall exclusive to the qualifying mode, the mall interface of the ranking mall comprising at least one virtual item purchasable using the virtual ranking coin.

10. The method according to claim 8, further comprising: displaying an entrance of personal information of the user account; and in response to a trigger operation on the entrance of the personal information, displaying an account information page of the user account, and displaying, in the account information page, the virtual season badge obtained by the user account in the current season.

11. The method according to claim 8, further comprising: displaying an entrance of a virtual collection exclusive to the qualifying mode;

in response to a trigger operation on the entrance of the virtual collection, displaying at least one of: the virtual appearance reward obtained by the user account in the current season, or an exclusive virtual item purchased by the user account using the virtual ranking coin;

the exclusive virtual item being a virtual item exclusive to the qualifying mode in the current season.

12. The method according to claim 1, further comprising: displaying an entrance of a season activity page of the current season; and in response to a trigger operation on the entrance of the season activity page of the current season, displaying the season activity page, displaying, on the season activity page, at least one of: the journey reward obtained by the user account in the current season, or the journey reward upon meeting a next level threshold.

13. A user interface display apparatus, comprising:

at least one processor and at least one memory, the at least one memory storing at least one computer instruction, and the at least one computer instruction being loaded and executed by the at least one processor to implement:

displaying an arena entrance of a qualifying mode, the qualifying mode being one of at least two match modes provided by a client, and the qualifying mode being an arena mode for determining a gaming competence rank of a user account in a ranking list;

in response to a trigger operation on the arena entrance, controlling a virtual character of the user account to participate in a qualifying match of the qualifying mode;

in response to successfully participating in the qualifying match, displaying a journey value obtained in a current season during participating in the qualifying match, the journey value being a numeral value related to times of participating in qualifying matches in the current season by the user account, wherein the displaying the journey value obtained in the current season during participating in the qualifying match comprises displaying a sum of journey values obtained in the current season during participating in at least one qualifying match; in response to successfully participating in the qualifying match by the user account in a first duration of the current season, displaying an addition journey value obtained in the first duration during participating in the qualifying match; the addition journey value being greater than a single journey value obtained by the user account in a second duration, and the second duration being a duration in the current season except the first duration, wherein the displaying the sum of journey values obtained in the current season during participating in the at least one qualifying match comprises at least one of: displaying the journey value sum at a settlement interface; or, displaying the journey value sum at a season activity page entrance of the current season; and in response to that the journey value reaches a level threshold, displaying an obtained journey reward corresponding to the level threshold.

14. The apparatus according to claim 13, wherein the displaying the journey value obtained in the current season during participating in the qualifying match comprises at least one of:

displaying a sum of journey values obtained in the current season during participating in at least one qualifying match; or displaying a single journey value obtained in the current season during participating in a single qualifying match.

15. The apparatus according to claim 14, wherein the displaying the single journey value obtained in the current season during participating in the single qualifying match comprises:

in response to that the user account participates in the single qualifying match and wins in the single qualifying match, displaying a first quantity of the journey values obtained in the current season during participating in the single qualifying match; and in response to that the user account participates in the single qualifying match and loses in the single qualifying match, displaying a second quantity of the journey values in the current season during participating in the single qualifying match;

the first quantity being less than or equal to the second quantity.

16. A non-transitory computer storage medium, the computer readable storage medium storing at least one computer instruction, and the at least one computer instruction being loaded and executed by at least one processor to implement:

displaying an arena entrance of a qualifying mode, the qualifying mode being one of at least two match modes provided by a client, and the qualifying mode being an arena mode for determining a gaming competence rank of a user account in a ranking list;

in response to a trigger operation on the arena entrance, controlling a virtual character of the user account to participate in a qualifying match of the qualifying mode;

in response to successfully participating in the qualifying match, displaying a journey value obtained in a current season during participating in the qualifying match, the journey value being a numeral value related to times of participating in qualifying matches in the current season by the user account, wherein the displaying the journey value obtained in the current season during participating in the qualifying match comprises displaying a sum of journey values obtained in the current season during participating in at least one qualifying match; in response to successfully participating in the qualifying match by the user account in a first duration of the current season, displaying an addition journey value obtained in the first duration during participating in the qualifying match; the addition journey value being greater than a single journey value obtained by the user account in a second duration, and the second duration being a duration in the current season except the first duration, wherein the displaying the sum of journey values obtained in the current season during participating in the at least one qualifying match comprises at least one of: displaying the journey value sum at a settlement interface; or, displaying the journey value sum at a season activity page entrance of the current season; and in response to that the journey value reaches a level threshold, displaying an obtained journey reward corresponding to the level threshold.

* * * * *